United States Patent
Zelch

(10) Patent No.: US 6,237,629 B1
(45) Date of Patent: May 29, 2001

(54) APPARATUS FOR POSITIVE WATER RETENTION AND CIRCULATION IN STORAGE TANKS

(76) Inventor: Clyde H. Zelch, P.O. Box 525, Owensville, MO (US) 65066

( * ) Notice: Subject to any disclaimer, the term of this patent is extended or adjusted under 35 U.S.C. 154(b) by 0 days.

(21) Appl. No.: 09/344,404

(22) Filed: Jun. 24, 1999

(51) Int. Cl.$^7$ .................................................. E03B 11/12
(52) U.S. Cl. .......................... 137/592; 137/593; 137/493.7
(58) Field of Search ............................ 137/590, 592, 137/593, 565.34, 493.7

(56) References Cited

U.S. PATENT DOCUMENTS

| | | | | |
|---|---|---|---|---|
| 143,711 | * | 10/1873 | Pearsons | 137/592 |
| 531,304 | * | 12/1894 | Dousman | 137/493.7 X |
| 550,064 | * | 11/1895 | Wilson | 137/592 |
| 684,767 | * | 10/1901 | Duryea | 137/565.34 X |
| 779,316 | * | 1/1905 | Robinson | 137/592 X |
| 2,128,617 | * | 8/1938 | Lawlor | 137/592 X |
| 2,255,460 | | 9/1941 | Weaver . | |
| 2,600,521 | * | 6/1952 | Swisher | 137/592 |
| 2,813,401 | * | 11/1957 | Smith | 137/493.7 X |
| 2,932,313 | | 4/1960 | Noland . | |
| 3,084,472 | * | 4/1963 | Feik | 137/592 X |
| 3,102,799 | * | 9/1963 | Kiekhaefer | 137/592 |
| 3,201,942 | | 8/1965 | Yamamoto . | |
| 4,465,020 | | 8/1984 | Schafer . | |
| 4,664,143 | * | 5/1987 | Thompson | 137/567 |
| 4,718,452 | * | 1/1988 | Maitland | 137/592 |
| 4,815,494 | * | 3/1989 | Raikamo | 137/593 |

FOREIGN PATENT DOCUMENTS

124653 * 5/1972 (NO) .................................. 137/592

* cited by examiner

Primary Examiner—John Rivell
(74) Attorney, Agent, or Firm—Kevin L. Klug

(57) ABSTRACT

An apparatus for positive water retention and circulation in single entrance pipe water storage tanks having an arrangement of directional flow check valves coupled to allow injection of water entering the tank at a different level than water exiting the tank. In a preferred embodiment water enters the tank at a higher level than water leaving the tank. The arrangement minimizes thermostratification within the tank in warmer months and further helps to minimize surface ice buildup in colder months.

7 Claims, 3 Drawing Sheets

APPARATUS FOR POSITIVE WATER RETENTION AND CIRCULATION IN STORAGE TANKS

BACKGROUND OF THE INVENTION

The present invention relates in general to water circulation systems for potable water storage tanks and more particularly, to an apparatus for use with single pipe water storage tanks which minimizes thermostratifying and further promotes water circulation with a positive retention time.

With many conventional potable water storage tanks as used in a typical city or county water supply, a single pipe is used to fill and drain the water within. Typically, this single pipe injects and removes water from the base of the storage tank. In such a system, the water which enters the tank is usually the water which exits immediately thereafter when a supply of water is needed by the community. This means that there is little if any retention time for water which is injected into the tank. This is especially true in warmer months when the water which enters is often colder than the water within the tank and therefore tends to remain at the lowest portion of the tank. Thus, water which is removed is typically the same water which immediately theretofore entered. This form of water removal precludes thorough mixing with or depletion of water which was at the upper portions of the storage tank. Without a through mixing of inlet and outlet water, the tank tends to thermostratify. This means that the water has a temperature gradient within the tank. The colder portions of said gradient tend to induce sweating on the outside of said storage tank and thereby cause said tank to externally deteriorate. That is, since the tanks are typically manufactured of an external ferrous metal material, said material oxidizes or its exterior coating deteriorates due to the sweated moisture present on its exterior surface. Furthermore, in chlorinated water supply systems, the lack of thorough mixing within a single pipe system denies any injected chlorine the time to circulate and mix with the water within the storage tank. This may cause excessively low or high concentrations of chlorine in the municipal water supply.

In the colder months, ice will typically form on the top surface of the water held in a storage tank. The greater the ice buildup, the greater the potential for damage to the interior protective coating of the storage tank. Thus, a city or county water supplier has a vested interest in minimizing surface ice buildup. In the winter months, water which enters the tank from the base is typically warmer than the surrounding water. Unfortunately, with a conventional single pipe system, the inlet water is unable to reach the top surface of the storage water without diffusing and cooling with the water stored within the tank. Thus, the potential for inlet water minimizing surface freezing within the tank is not utilized.

Prior to the art of the present invention, the only solution for solving the thermostratification problem in a single pipe system has been the incorporation of a separate inlet and outlet pipes. That is, the inlet pipe functions only as a conduit for inlet water and a second pipe of sufficient fire flow diameter is added to provide outlet flow at the base of the water storage tank. This modification is quite costly and time consuming.

Accordingly, it is an object of the present invention to provide an apparatus for positive water retention and circulation in storage tanks which injects inlet water at a higher level within the storage tank and removes water from a lower level within the tank thereby promoting a positive retention time of injected water.

Another object of the present invention is to provide an apparatus for positive water retention and circulation in storage tanks which is easily adaptable to a conventional single pipe potable water storage tank.

A further object of the present invention is to provide an apparatus for positive water retention and circulation in storage tanks which minimizes thermostratification within the storage tank and also provides for a thorough mixing of inlet and outlet water.

A still further object of the present invention is to provide an apparatus for positive water retention and circulation in storage tanks which is able to minimize ice buildup on the surface of the stored water during winter months.

SUMMARY OF THE INVENTION

To accomplish the foregoing and other objects of this invention there is provided an apparatus for positive water retention and circulation in storage tanks in conjunction with a single pipe potable water storage tank. In a preferred embodiment, the apparatus comprises two or more directional flow control check valves which mate onto and with the entrance or inlet pipe for a single pipe water storage tank, and an extension pipe for directing the inlet water near or above the top surface of the stored water. Said flow control check valves are typically one way flapper valves, but may comprise other types of directional valves which allow water flow in only one direction.

In a single pipe water storage tank, the water enters and exits through a pipe at the base of the tank. The present art apparatus in preferred and alternative embodiment forms, fits onto the single entrance pipe and directs water entering the tank through the extension pipe and water leaving the tank through the one or more exiting flow control check valves near the base. This arrangement creates water inflow to the upper portions of the tank and water removal from the lower portions of the tank. A preferred embodiment will utilize two directional flow control check valves near the base of the tank for exiting water and one check valve within or below the extension pipe which allows water to enter the upper portions of the tank. Alternative embodiments may remove the inlet directional flow control valve and place the extension pipe above the surface of the water. Further alternative embodiments may utilize more or less than two directional flow control check valves for exiting water.

In a preferred embodiment, a pipe coupler having four ports, two substantially horizontal and two substantially vertical, is placed onto the potable water storage tank entrance pipe. The entrance pipe is coupled to the lower most substantially vertical port of said coupler. Onto the upper most substantially vertical port is coupled an extension pipe and an inlet flow control check valve. Onto each of the substantially horizontal ports is coupled an exiting flow control check valve. Each flow control check valve allows water to flow in only one direction, thus proper direction placement is critical. Since said pipe coupler is located near the base of the water storage tank, said exiting flow control check valves are able to ensure that only water from the base of the tank exits when a demand is placed upon the water tank. All entering water is transferred near or above the surface of the water level by the extension pipe. An alternative embodiment may incorporate a pipe coupler having only three ports, thereby providing only one exiting flow control check valve near the base of the tank. Further alternative embodiments may incorporate a pipe coupler having a plurality of ports together with a plurality of check valves. All embodiments incorporate exiting flow control check valves which in combination are of sufficient size to allow fill fire flow capacity as required by the community serviced.

The present art may be adapted for elevated leg water storage tanks having a wet riser as shown in Figure two or ground storage tanks having a water column extending to ground level as shown in Figure one. A wet riser is a term of art which describes a pipe connected around the entrance of inlet pipe and of substantially larger diameter. The wet riser forms a water column of typically three (3) feet or larger size around the inlet pipe and couples with the storage tank. This wet riser pipe typically mates and connects with the base of the elevated water storage tank and extends downward to ground level. With the art of the present invention, water is removed from the base of the wet riser or water column near ground level. That is, the exiting flow control check valves are placed within ports on the inlet or entrance pipe near the wet riser or water column base near ground level. The inlet flow control valve is placed and functions as aforementioned. Alternative embodiments may incorporate more than one inlet flow control check valve. This concept of having a water column extending to ground level and placing the exiting flow control check valves near said ground level is shown in Figures one and two of the present application.

The apparatus of the present art may be manufactured of many types of materials including but not limited to plastic, rubber, metal, composites, ceramic or any other material which may direct and control the flow of water. The apparatus of the present art may further be used with liquids other than water when positive retention is required.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
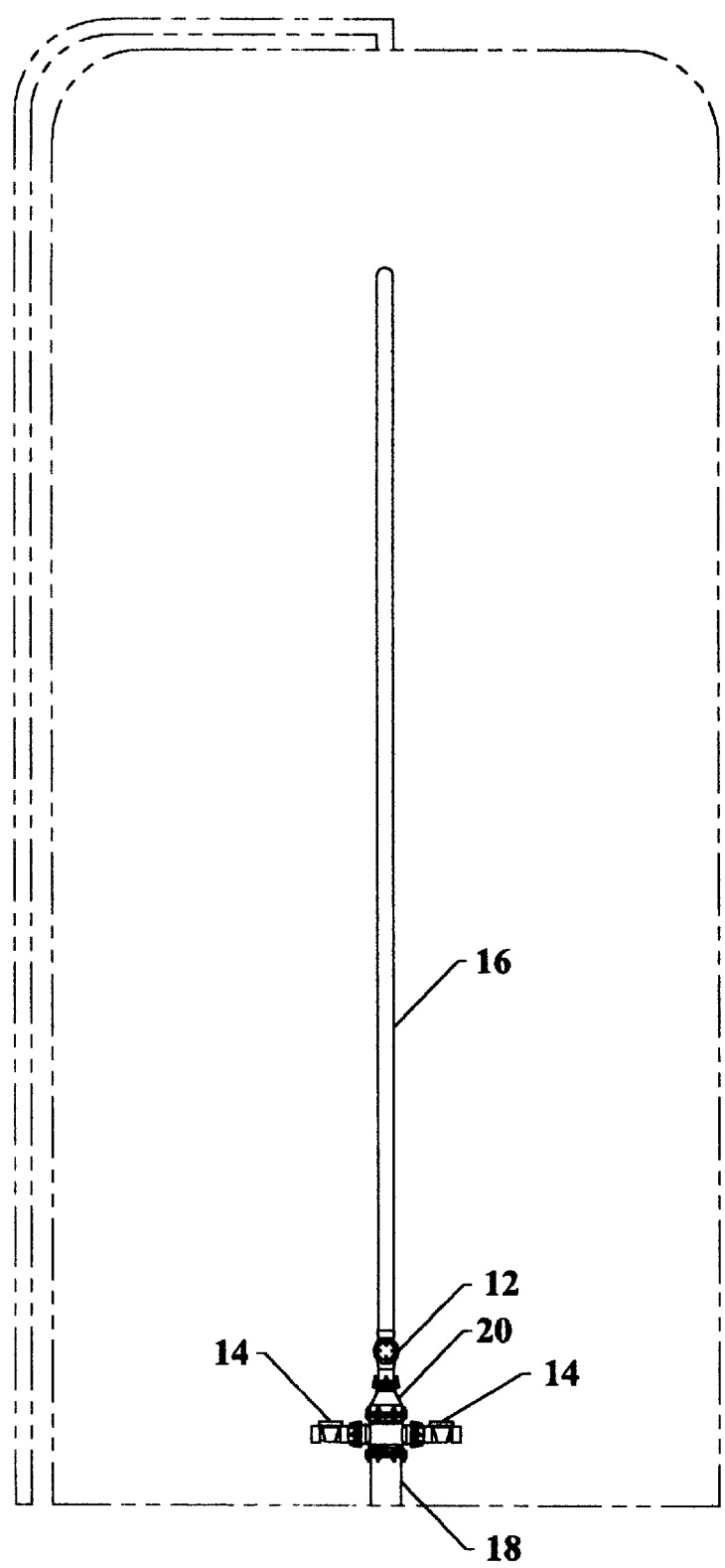
FIG. 1 is a plan view of an apparatus for positive water retention and circulation in storage tanks together with and positioned within a ground storage tank shown in phantom.
Figure 2:
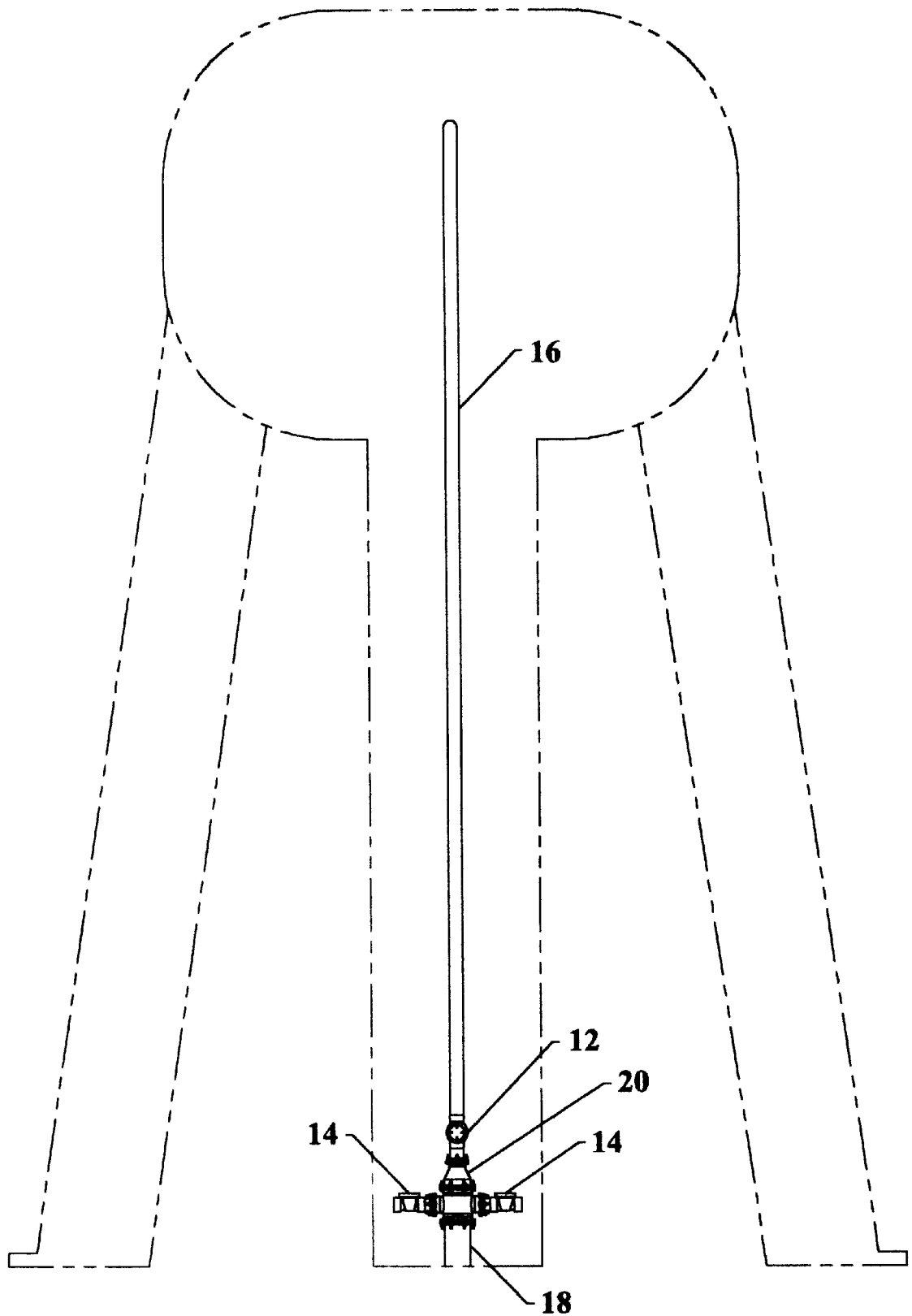
FIG. 2 is a plan view of an apparatus for positive water retention and circulation in storage tanks together with and positioned within an elevated leg tank with a wet riser shown in phantom.
Figure 3:
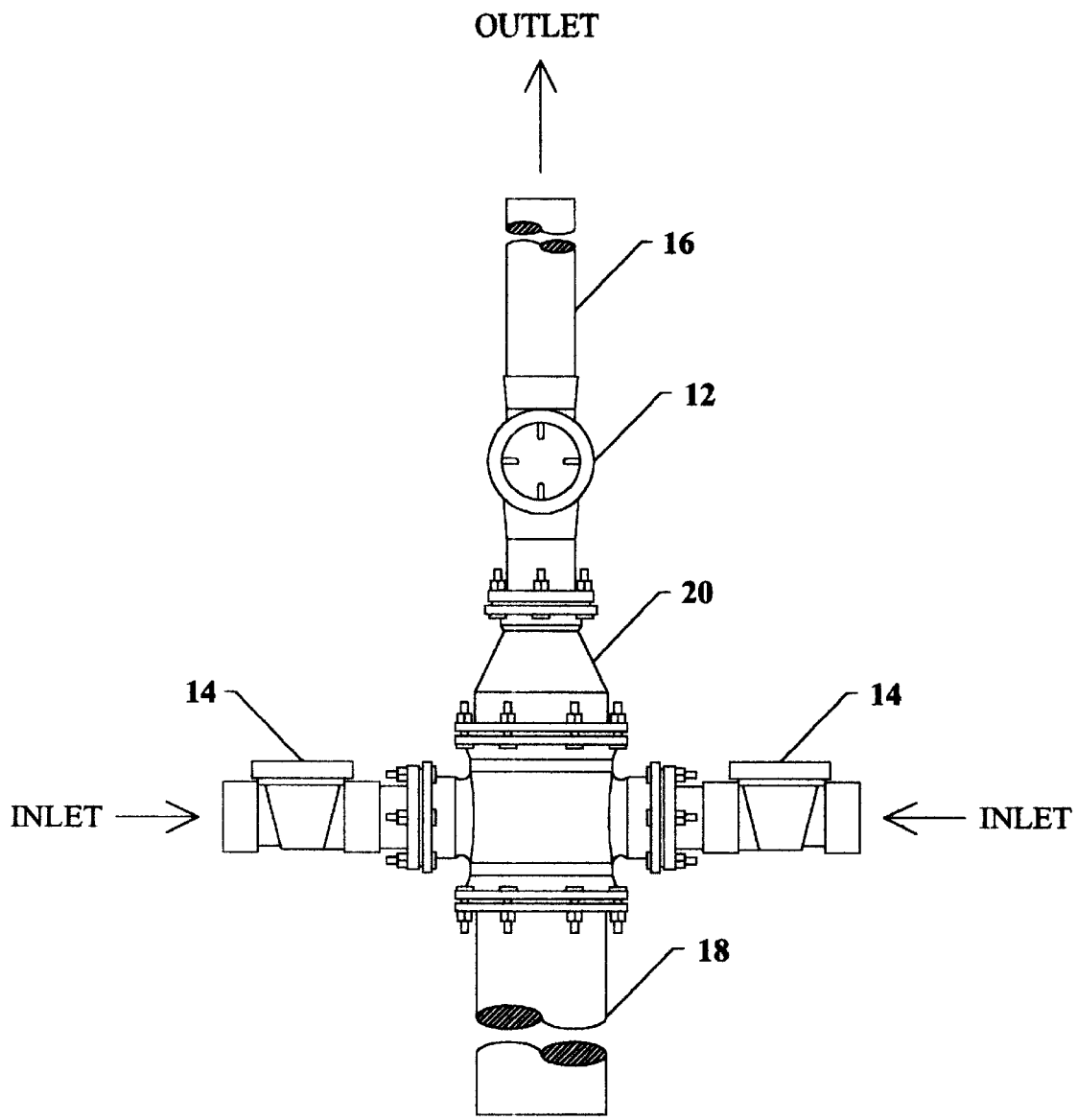
FIG. 3 is a plan view of an apparatus for positive water retention and circulation in storage tanks standing alone.

Referring now to the drawings, there is shown in FIGS. 1–3 an apparatus for positive water retention and circulation in storage tanks together with the entrance pipe and storage tanks of FIGS. 1–2. The apparatus for positive water retention and circulation in storage tanks 10 is particularly adapted for use with single entrance pipe potable water storage tanks without installation of a second entrance or exit pipe.

The drawings show the apparatus for positive water retention and circulation in storage tanks 10 in conjunction with said storage tanks comprising one or more inlet flow control check valves 12, one or more exiting flow control check valves 14, one or more extension pipes 16, an entrance pipe 18, and a pipe coupler 20. Alternative embodiments may forego the use of the inlet flow control check valve 12 provided that the extension pipe 16 is placed above the water level within the tank.

A conventional single pipe water storage tank or reservoir has a single entrance pipe 18 which provides inlet and outlet (exiting) water flow to the tank. That is, the municipal water mains are connected directly with the entrance pipe 18 and the municipal water pump system. The preferred embodiment of the present invention in conjunction with said single pipe water storage tank places and secures a pipe coupler 20 onto said entrance pipe 18. In a preferred embodiment, the pipe coupler has four ports, one for connection to the entrance pipe 18, one for connection to the inlet flow control check valve 12 and extension pipe 16 combination, and two for connection with two exiting flow control check valves 14. Each component is typically secured with and onto the pipe coupler 20 with bolts. Alternative embodiments may secure each component with welds, glue, solvents, threads, pins, press fits or any other bonding mechanism which is able to withstand the pressure and flow of the water within the pipe coupler 20. Alternative embodiments may also have more or less than two ports on the pipe coupler 20 for connection with the exiting flow control check valve(s) 14. Further alternative embodiments may include more than one port for connection with the inlet flow control check valve 12 and extension pipe 16 combination.

The inlet flow control check valve 12 and extension pipe 16 combination is attached to the pipe coupler 20 in such a fashion as to allow inlet water flow toward the topmost portions of the water storage tank. In a preferred embodiment, the inlet flow control check valve 12 is placed onto and immediately after the pipe coupler 20 and the extension pipe 16 is connected to the outlet port of the inlet flow control check valve 12 in such a fashion as to direct water to the upper portions of the water storage tank. Alternative embodiments may place the inlet flow control check valve 12 after or within the extension pipe 16 and fulfill the expectations of the present art. No geometric limitations are placed on the shape of the inlet flow control check valve 12 or extension pipe 16. That is, they need not be straight or curved, provided that the combination allows water to enter near the top portions of the tank. An alternative embodiment may forego use of the inlet flow control check valve 12 and place the extension pipe 16 directly onto the pipe coupler 20. In such an alternative embodiment, the extension pipe 18 is typically placed such that water enters above the water surface level and thereby cannot exit the extension pipe 18.

In a preferred embodiment, two exiting flow control check valves 14 are placed onto the pipe coupler 20 near the entrance pipe 18. In all embodiments, the exiting flow control check valve 14 is placed near the base of the water storage tank or at the base of the wet riser as shown in FIG. 2 or at the base of the water column as shown in FIG. 1. This placement ensures that water exiting the tank will be drawn from the base of the tank or from near ground level as depicted in FIGS. 1 & 2. The directional flow placement of said valves 14 allows water only to flow in an exiting direction through said pipe coupler 20 and into said entrance pipe 18. Typically, the exiting flow control check valves 14 in combination are of sufficient size to allow full fire flow capacity to the community served. Again, said flow control check valves 12, 14 are typically one way flapper valves, but may comprise other types of directional valves which allow water flow in only one direction.

In operation, the municipal water supply pump injects water into the entrance pipe 18 and through the pipe coupler 20, the inlet flow control check valve 12, and the extension pipe 16. This places the inlet water substantially above the base of the storage tank depending upon the height of the extension pipe 16. Water is unable to flow into the base of the tank through the exiting flow control check valves 14 due to the fact that said directional valves 14 are automatically locked closed during inlet water pressurization. When a supply of water is required from the water storage tank, water begins to flow out of the entrance pipe 18 and is only able to be supplied from water flowing through the exiting flow control check valve(s) 14, again due to the directional flow of the inlet flow control check valve 12. That is, the inlet flow control check valve 12 is placed such that it will not allow water to flow out of the tank, whereas the exiting flow control check valve(s) 14 is placed such that it will allow water to flow out of the base of the tank, through the pipe coupler 20 and into the entrance pipe 18. Should an alternative embodiment be used which does not utilize an inlet flow control check valve 12, water enters through the extension pipe 16 which is above the water surface level and obviously cannot exit said pipe 16 since the water level is below point of entrance.

From the foregoing description, those skilled in the art will appreciate that all objects of the present invention are realized. An apparatus for positive water retention and circulation in storage tanks together with the entrance pipe and storage tanks has been shown and described. The device of this invention is able to provide inlet water to a storage tank through a single pipe and ensure that water entering said tank is placed at a higher elevation than water exiting, thereby ensuring a positive retention time and thorough mixing.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. An apparatus for positive water retention and circulation comprising in combination with a single pipe potable water storage tank having a water column extending near ground level and an entrance pipe near a base and ground level of said water storage tank:

a pipe coupler having at least three ports placed near said ground level, at least one port of said pipe coupler connected to said entrance pipe; and one or more inlet flow control check valves together with an extension pipe directionally connected to at least one of said pipe coupler ports which are unconnected to said entrance pipe, whereby water flowing into said tank is only able to flow through said one or more inlet flow control check valves and into said tank substantially above the level of said base of said water storage tank; and one or more exiting flow control check valves directionally connected near the base of said tank and said ground level with said ports of said pipe coupler which are unconnected to said entrance pipe or said one or more inlet flow control check valves and extension pipe combination, whereby water flowing out of said tank is able to only flow through said one or more exiting flow control check valves, said exiting flow control check valves in combination of sufficient diameter to allow full exiting fire flow capacity for those served by said tank.

2. The apparatus for positive water retention as set forth in claim 1 whereby:

said connection between said pipe coupler and said entrance pipe, said one or more inlet flow control check valves and extension pipe combination, and said one or more exiting flow control check valves are of sufficient strength to withstand the pressure and flow of the potable water flowing through said pipe coupler and yet retain a water tight seal.

3. An apparatus for positive water retention and circulation in combination with a single pipe potable water storage tank having a water column extending near ground level and an entrance pipe and a base near ground level comprising:

a pipe coupler having four ports placed near said ground level, a first port of said pipe coupler connected to said entrance pipe; and an inlet flow control check valve directionally connected to a second port of said pipe coupler opposite said first port, whereby water flowing into said tank is able to only flow through said inlet flow control check valve; and an extension pipe connected to said inlet flow control check valve opposite said pipe coupler and extended into said tank opposite said base, whereby said extension pipe may provide inlet water substantially above the level of said base of said water storage tank; and two exiting flow control check valves directionally connected near the base of said tank and near ground level with a third and fourth port of said pipe coupler, whereby water flowing out of said tank is able to only flow through said flow control check valves.

4. The apparatus for positive water retention as set forth in claim 3 whereby:

said connection between said pipe coupler and said entrance pipe, said one or more inlet flow control check valves, and said one or more exiting flow control check valves are of sufficient strength to withstand the pressure and flow of the potable water flowing through said pipe coupler and yet retain a water tight seal.

5. A method for creating positive water retention and circulation within a single pipe water storage tank having a water column extending near ground level comprising:

installing a pipe coupler having three or more ports onto an entrance pipe within and near a base of said water storage tank and near ground level; and installing and attaching an inlet flow control check valve onto a port of said pipe coupler whereby water may enter said storage tank through said inlet flow control check valve; and securing an extension pipe onto an outlet port of said inlet flow control check valve and extending said extension pipe within said storage tank whereby water directed through said extension pipe is directed to an upper portion of said storage tank; and installing and attaching one or more exiting flow control check valves onto the remaining unused ports of said pipe coupler near ground level thereby ensuring that water may only exit said storage tank through said exiting flow control check valves, and filling said storage tank by injecting water into the entrance pipe and through said pipe coupler and said inlet flow control check valve and said extension pipe whereby said water is placed substantially above the base of said storage tank; and supplying water from said storage tank by allowing water to flow through said exiting flow control check valves and through said pipe coupler and into said entrance pipe, whereby water filling at a level above said exiting flow control check valves is able to mix thoroughly with water in the storage tank before exiting.

6. An apparatus for positive water retention and circulation in combination with a single pipe potable water storage tank having a water column extending near ground level and an entrance pipe near a base and ground level of said water storage tank comprising:

a pipe coupler having at least three ports placed near said ground level, at least one port of said pipe coupler connected to said entrance pipe; and an extension pipe connected to at least one port of said pipe coupler which is unconnected to said entrance pipe, said extension pipe extending above a water level in said tank, whereby water flowing into said tank through said extension pipe enters above said water level in said tank; and one or more exiting flow control check valves directionally connected near the base and ground level of said tank with said ports of said pipe coupler which are unconnected to said entrance pipe or said extension pipe, whereby water flowing out of said tank is able to only flow through said one or more exiting flow control check valves, said exiting flow control check valves in combination of sufficient diameter to allow full exiting fire flow capacity for those served by said tank.

7. The apparatus or positive water retention as set forth in claim 6 whereby:

said connection between said pipe coupler and said entrance pipe, said extension pipe, and said one or more exiting flow control check valves are of sufficient strength to withstand the pressure and flow of the potable water flowing through said pipe coupler and yet retain a water tight seal.

* * * * *